US008777054B2

(12) United States Patent
Young et al.

(10) Patent No.: US 8,777,054 B2

(45) Date of Patent: Jul. 15, 2014

(54) APPARATUS FOR DISPENSING SOLID ARTICLES AND METHODS FOR USING SAME

(75) Inventors: Demetris P. Young, Durham, NC (US); Bradley Kenneth Smith, Cary, NC (US); Deborah H. Heller, Raleigh, NC (US)

(73) Assignee: PARATA Systems, LLC, Durham, NC (US)

( * ) Notice: Subject to any disclaimer, the term of this patent is extended or adjusted under 35 U.S.C. 154(b) by 92 days.

(21) Appl. No.: 13/354,271

(22) Filed: Jan. 19, 2012

(65) Prior Publication Data

US 2012/0187141 A1 Jul. 26, 2012

Related U.S. Application Data

(60) Provisional application No. 61/435,080, filed on Jan. 21, 2011.

(51) Int. Cl.

*B65D 83/04* (2006.01)
*B65G 59/00* (2006.01)
*B65H 3/00* (2006.01)

(52) U.S. Cl.

USPC ............................ 221/209; 221/278; 221/282

(58) Field of Classification Search

USPC .......................... 221/282, 199, 278, 209, 200

See application file for complete search history.

(56) References Cited

U.S. PATENT DOCUMENTS 4,018,358 A 4/1977 Johnson et al.
4,573,606 A 3/1986 Lewis et al.
4,674,651 A 6/1987 Scidmore et al.
4,697,721 A 10/1987 Johnson et al.
4,801,044 A 1/1989 Kubota et al.
5,325,801 A 7/1994 Fiorido
5,405,048 A 4/1995 Rogers et al.
6,053,302 A 4/2000 Leu et al.
6,561,377 B1 5/2003 Pearson et al.
6,631,826 B2 10/2003 Pollard et al.
6,971,541 B2 12/2005 Williams et al.
6,971,544 B2 12/2005 Williams et al.
6,997,341 B2 2/2006 Pearson et al.
7,303,094 B2 12/2007 Hutchinson et al.
7,344,049 B2 3/2008 Daniels et al.
7,596,932 B2 10/2009 Sink et al.
7,726,514 B2 6/2010 Janet et al.
7,832,591 B2 * 11/2010 Karwacki et al. ................ 221/7
7,837,061 B2 11/2010 Dummer et al.
7,919,427 B2 4/2011 Ota et al.
2006/0006190 A1 1/2006 Janet et al.
2007/0264926 A1 11/2007 Sonntag
2008/0029535 A1 2/2008 Kim
2008/0061074 A1 3/2008 Remis et al.
2008/0110555 A1 5/2008 Bouchelle et al.

(Continued)

*Primary Examiner* — Michael K Collins

(74) *Attorney, Agent, or Firm* — Myers Bigel Sibley & Sajovec, PA

(57) ABSTRACT

An apparatus for dispensing solid articles includes a manifold assembly. The manifold assembly includes a manifold and a door assembly. The manifold has a plenum and an inlet port in fluid communication with the plenum. The door assembly includes a door panel and a shield. The door panel is selectively moveable between a closed position, wherein the door panel restricts airflow through the inlet port, and an open position, wherein the door panel permits airflow through the inlet port. The shield defines a pocket to receive the door panel in the open position and thereby reduce or restrict flow of air behind the door panel.

19 Claims, 15 Drawing Sheets

(56) References Cited

U.S. PATENT DOCUMENTS

| | | | | |
|---|---|---|---|---|
| 2008/0110921 | A1 | 5/2008 | DuMond et al. | |
| 2008/0168751 | A1 | 7/2008 | Sink et al. | |
| 2008/0283540 | A1 | 11/2008 | Kulberg et al. | |
| 2008/0283543 | A1* | 11/2008 | Karwacki et al. | 221/7 |
| 2008/0283544 | A1 | 11/2008 | Daniels et al. | |
| 2008/0283549 | A1 | 11/2008 | Dummer et al. | |
| 2008/0283734 | A1 | 11/2008 | Michelli et al. | |
| 2008/0288105 | A1* | 11/2008 | Mauger et al. | 700/231 |
| 2009/0039097 | A1 | 2/2009 | Farnsworth et al. | |
| 2009/0140002 | A1 | 6/2009 | Farnsworth et al. | |
| 2009/0272758 | A1* | 11/2009 | Karwacki et al. | 221/278 |
| 2009/0294464 | A1 | 12/2009 | Michelli et al. | |
| 2010/0006584 | A1* | 1/2010 | Michelli | 221/1 |

* cited by examiner

APPARATUS FOR DISPENSING SOLID ARTICLES AND METHODS FOR USING SAME

RELATED APPLICATION(S)

The present application claims the benefit of U.S. Provisional Patent Application No. 61/435,080, filed Jan. 21, 2011, the disclosure of which is hereby incorporated herein by reference in its entirety.

FIELD OF THE INVENTION

The present invention is directed generally to the dispensing of solid pharmaceutical articles and, more specifically, is directed to the automated dispensing of solid pharmaceutical articles.

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. For example, U.S. Pat. No. 6,971,541 to Williams et al. describes an automated system for dispensing pharmaceuticals using dispensing bins. Each dispensing bin includes a hopper in which tablets are stored and a dispensing channel fluidly connecting the hopper to a dispensing outlet. Forward and reverse air flows are used to selectively convey the tablets through the dispensing channel in each of a dispensing direction (toward the outlet) and a reverse direction (toward the hopper). A counting sensor is positioned proximate the outlet of the dispensing channel and used to detect tablets passing the sensor in order to maintain a count of the tablets dispensed.

SUMMARY OF THE INVENTION

According to embodiments of the present invention, an apparatus for dispensing solid articles includes a manifold assembly. The manifold assembly includes a manifold and a door assembly. The manifold has a plenum and an inlet port in fluid communication with the plenum. The door assembly includes a door panel and a shield. The door panel is selectively moveable between a closed position, wherein the door panel restricts airflow through the inlet port, and an open position, wherein the door panel permits airflow through the inlet port. The shield defines a pocket to receive the door panel in the open position and thereby reduce or restrict flow of air behind the door panel.

The door assembly may include a spring member biasing the door panel into the closed position.

In some embodiments, the door assembly includes a body and an integral manifold gasket mounted on the body. The manifold gasket surrounds the inlet port and forms an airtight seal between the body and the manifold.

In some embodiments, the door assembly includes a body and an integral door gasket mounted on the body. The door gasket surrounds the inlet port and forms an airtight seal between the body and the door panel when the door panel is in the closed position.

According to some embodiments, the door gasket includes first and second gasket portions. The first gasket portion is configured to form the airtight seal between the body and the door panel when the door panel is in the closed position. The second gasket portion is configured to engage a dispensing bin when the dispensing bin is mounted on the manifold assembly and to thereby form an airtight seal between the body and the dispensing bin.

In some embodiments, the door assembly includes a body defining a hinge channel and having a sealing face. The door assembly further includes a door including the door panel and a pivot rod portion pivotally mounted in the hinge channel to permit the door panel to pivot about a pivot axis between the open and closed positions. The hinge channel is oversized relative to the pivot rod portion so that the pivot axis can float fore and aft with respect to the sealing face.

According to some embodiments, the door assembly includes a body and an electrical connector. The body has a connector mount portion. The electrical connector is mounted on the connector mount portion and configured to operatively engage an electrical connector on a dispensing bin.

In some embodiments, the door assembly includes an actuator portion connected to the door panel and operable to transition the door panel between the open and closed positions. The shield defines a shield passage extending therethrough and configured to receive an actuator of a dispensing bin mounted on the door manifold assembly such that the actuator can selectively displace the actuator portion to open and close the door panel.

The door assembly may include at least one integral manifold guide feature configured to engage a dispensing bin to align the dispensing bin with the manifold assembly. The at least one integral manifold guide feature may include a pair of opposed guide features, wherein each of the pair of manifold guide features includes an elongate guide rail or an elongate guide groove. In some embodiments, the door assembly includes a body defining a doorway passage and the shield is integral with the body, and the manifold guide features are integrally formed in the shield.

The apparatus may further include a dispensing bin having a dispensing bin port, wherein the dispensing bin is removably mounted on the manifold assembly such that, when the door panel is in the closed position, the door panel restricts airflow through the dispensing bin port, and when the door panel is in the open position, the door panel permits airflow through the dispensing bin port. In some embodiments, the dispensing bin defines a dispensing bin plenum adjacent the dispensing bin port, and the shield is disposed in the plenum. In some embodiments, the dispensing bin includes at least one integral dispensing bin guide feature, and the door assembly includes at least one integral manifold guide feature releasably engaging the least one integral dispensing bin guide feature to align the dispensing bin with the manifold assembly.

According to some embodiments, the apparatus includes a vacuum source fluidly connected to the manifold such that, when the door panel is in the open position, the vacuum source is operable to provide a suction flow at the inlet port.

According to method embodiments of the present invention, a method for dispensing solid articles includes providing a dispensing apparatus including a manifold assembly. The manifold assembly includes a manifold and door assembly. The manifold has a plenum and an inlet port in fluid communication with the plenum. The door assembly includes a door panel and a shield. The door panel is selectively moveable between a closed position, wherein the door panel restricts airflow through the inlet port, and an open position, wherein the door panel permits airflow through the inlet port. The shield defines a pocket to receive the door panel in the open position and thereby reduce or restrict flow of air behind the door panel. The method further includes selectively moving the door panel between the open and closed positions to control airflow through the inlet port.

According to some embodiments, the dispensing apparatus further includes a dispensing bin having a dispensing bin port, and the method includes removably mounting the dispensing bin on the manifold assembly such that, when the door panel is in the closed position, the door panel restricts airflow through the dispensing bin port, and when the door panel is in the open position, the door panel permits airflow through the dispensing bin port.

In some embodiments, the dispensing bin includes at least one integral dispensing bin guide feature, the door assembly includes at least one integral manifold guide feature, and removably mounting the dispensing bin on the manifold assembly includes releasably engaging the least one dispensing bin guide feature with the at least one manifold guide feature to align the dispensing bin with the manifold assembly.

In some embodiments, the dispensing apparatus includes a vacuum source fluidly connected to the manifold, and when the door panel is in the open position, the vacuum source is operable to provide a suction flow at the inlet port and the dispensing bin port to induce an airflow through the dispensing bin. According to some embodiments, the dispensing bin defines a hopper chamber and contains a plurality of solid articles in the hopper chamber, and the induced airflow agitates the solid articles in the hopper chamber. According to some embodiments, the dispensing bin defines a dispensing channel and contains a plurality of solid articles, and the induced airflow drives the solid articles from the hopper chamber through the dispensing channel.

In some embodiments, the method includes: pre-assembling the door assembly as a unit including a body, the shield, and an integral gasket configured to engage the dispensing bin when the dispensing bin is mounted on the manifold assembly and to thereby form an airtight seal between the body and the dispensing bin; and thereafter mounting the pre-assembled door assembly on the manifold.

According to embodiments of the present invention, an apparatus for dispensing solid articles includes a manifold assembly and a dispensing bin. The manifold assembly includes a manifold and a door assembly. The manifold has a plenum and an inlet port in fluid communication with the plenum. The door assembly includes a door panel and at least one integral manifold guide feature. The door panel is selectively moveable between a closed position, wherein the door panel restricts airflow through the inlet port, and an open position, wherein the door panel permits airflow through the inlet port. The dispensing bin has a dispensing bin port and includes at least one integral dispensing bin guide feature. The dispensing bin is removably mounted on the manifold assembly such that: the at least one integral manifold guide feature releasably engages the least one integral dispensing bin guide feature to align the dispensing bin with the manifold assembly; when the door panel is in the closed position, the door panel restricts airflow through the dispensing bin port; and when the door panel is in the open position, the door panel permits airflow through the dispensing bin port.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
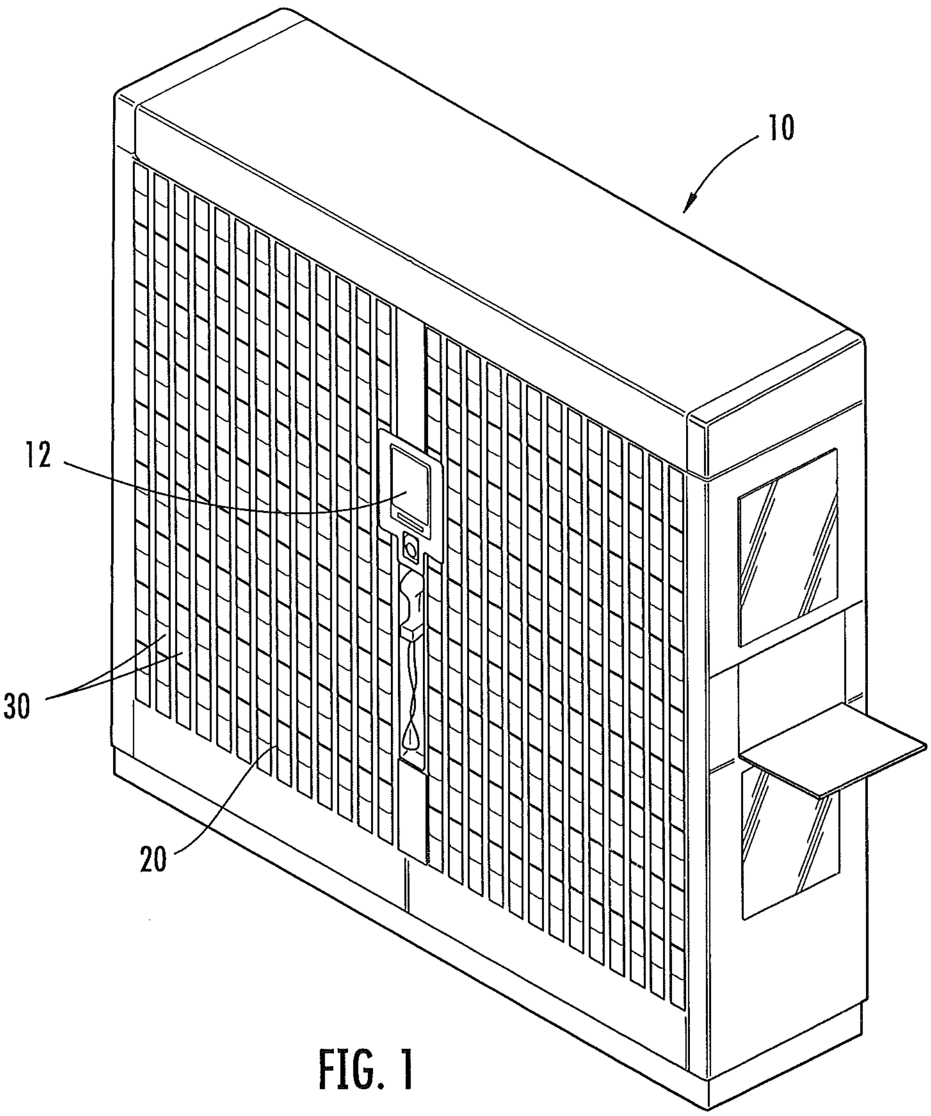
FIG. 1 is a front perspective view of a pharmaceutical tablet dispensing system according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As used herein, "monolithic" means an object that is a single, unitary piece formed or composed of a material without joints or seams.

In accordance with embodiments of the present invention, apparatus and methods are provided for dispensing solid articles. According to some embodiments, the solid articles are solid pharmaceutical articles. In particular, such methods and apparatus may be used to dispense pharmaceutical pills or tablets.

With reference to FIGS. 1-15, a dispensing system 10 according to embodiments of the present invention is shown therein. The dispensing system 10 may be a solid article dispensing system as disclosed in U.S. Pat. No. 7,832,591 to Karwacki et al. (hereinafter "Karwacki") and/or as disclosed in U.S. Patent Application Publication No. 2010/0006584 to Michelli (hereinafter "Michelli"), the disclosures of which are incorporated herein in their entireties, for example. Except as discussed herein, dispensing systems of the present invention may include all or some of the features, functionality and operations of one or both of Karwacki and Michelli. In particular, the dispensing system 10 may be used to dispense pharmaceutical tablets or pills using a forced air flow or flows.

Figure 2:
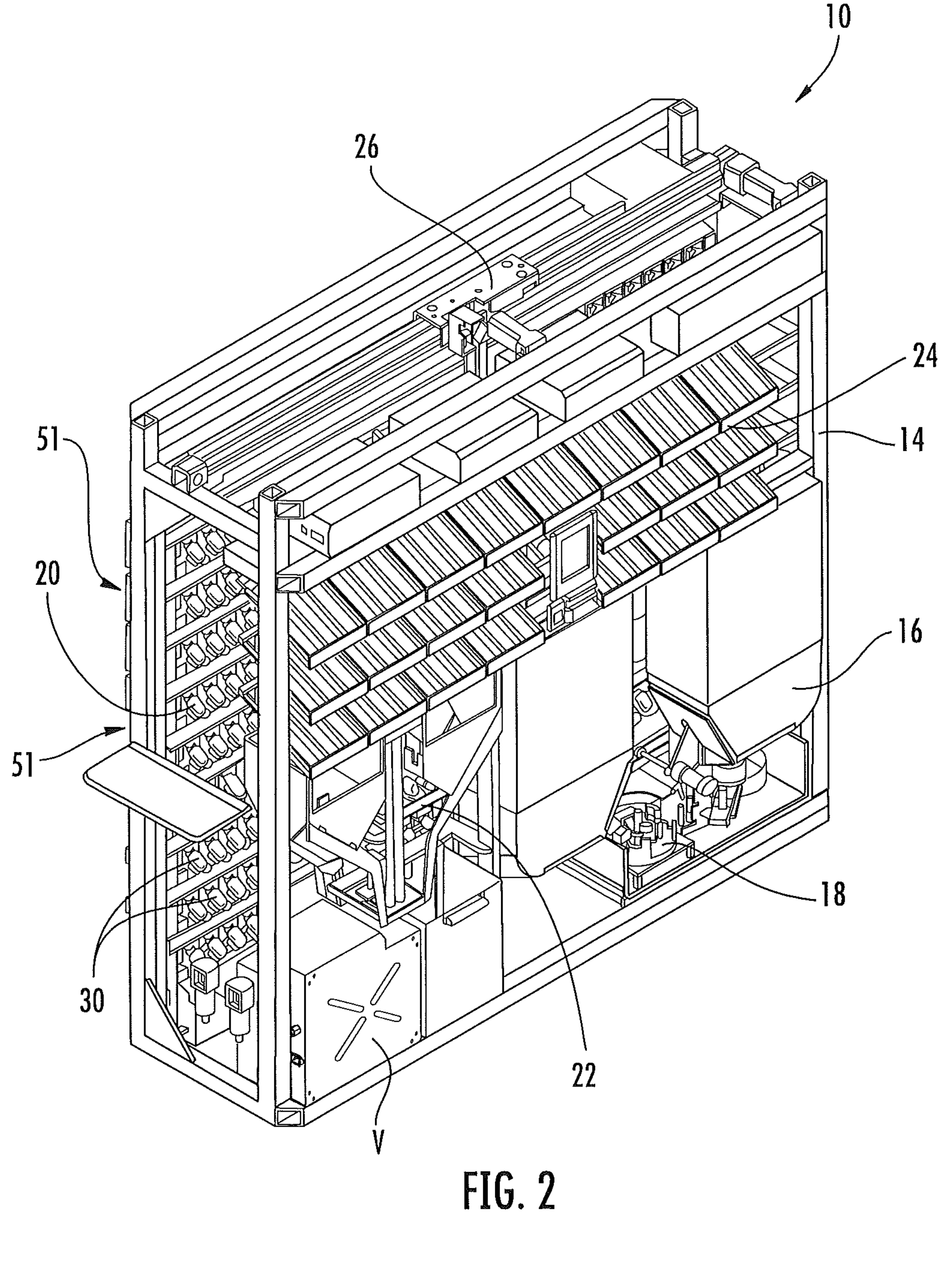
FIG. 2 is a cutaway, rear perspective view of the tablet dispensing system of FIG. 1.

The dispensing system 10 includes a manifold assembly 51 (FIGS. 3-5 and 8-15) and one or more dispensing bins 30 (only one bin 30 is shown in the figures other than FIGS. 1 and 2). A vacuum is induced in the manifold assembly 51 by a vacuum source V (FIG. 2) such as a vacuum motor or blower. The bin 30 can be removably and replaceably mounted on a frame of the dispensing system 10 as generally described in Karwacki and Michelli such that the bin 30 mates with the manifold assembly 51. As discussed herein, a door mechanism is provided to selectively control communication between the bin 30 and the vacuum. The vacuum source V provides suction (i.e., a negative pressure and vacuum flow) to the bin 30. In this way, a vacuum-induced airflow can be selectively generated through the bin 30 to generate one or more agitation gas flows and/or drive gas flows in the bin 30 to agitate or dispense articles therein, as discussed in detail in Karwacki and Michelli, for example.

With reference to FIGS. 1 and 2, the dispensing system 10 further includes a support frame 14 for the mounting of its various components. Those skilled in this art will recognize that the frame 14 illustrated herein is exemplary and can take many configurations that would be suitable for use with the present invention. The frame 14 provides a strong, rigid foundation to which other components can be attached at desired locations, and other frame forms able to serve this purpose may also be acceptable for use with this invention. According to some embodiments, the manifold assembly 51 is securely mounted on the frame 14.

The system 10 generally includes as operative stations a controller (represented herein by a graphical user interface 12), a container dispensing station 16, a labeling station 18, a tablet dispensing station 20, a closure station 22, and an offloading station 24. In the illustrated embodiment, containers, tablets and closures are moved between these stations with a dispensing carrier 26; however, in some embodiments, multiple carriers are employed. The dispensing carrier 26 has the capability of moving the container to designated locations within the frame 14. Except as discussed herein with regard to the dispensing station 20, each of the operative stations and the conveying devices may be of any suitable construction such as those described in detail in U.S. Pat. No. 6,971,541 to Williams et al., U.S. Pat. No. 7,344,049 to Daniels et al., U.S. Pat. No. 7,596,932 to Sink et al., U.S. Publication No. 2008-0110921-A1 to DuMond et al., U.S. Publication No. 2008-0110555-A1 to Bouchelle et al., and U.S. Publication No. 2008-0283544-A1 to Daniels et al., the disclosures of which are hereby incorporated herein in their entireties.

The controller 12 controls the operation of the remainder of the system 10. In some embodiments, the controller 12 will be operatively connected with an external device, such as a personal or mainframe computer, that provides input information regarding prescriptions. In other embodiments, the controller 12 may be a stand-alone computer that directly receives manual input from a pharmacist or other operator. The controller 12 may be distributed with a portion thereof mounted on each bin as described hereinbelow. As used herein, the controller 12 may refer to a central controller and/or a dedicated controller onboard an associated bin. An exemplary controller is a conventional microprocessor-based personal computer.

In operation, the controller 12 signals the container dispensing station 16 that a container of a specified size is desired. In response, the container dispensing station 16 delivers a container C (FIG. 8) to the labeling station 18. The labeling station 18 includes a printer that is controlled by the controller 12. The printer prints and presents an adhesive label that is affixed to the container. The carrier 26 moves the labeled container to the appropriate bin 30 for dispensing of tablets in the container.

Filling of labeled containers with tablets is carried out by the tablet dispensing station 20. The tablet dispensing station 20 comprises a plurality of the tablet dispensing bin assemblies or bins 30 (described in more detail below), each of which holds a bulk supply of individual tablets (typically the bins 30 will hold different tablets). Referring to FIGS. 1 and 2, the dispensing bins 30, which may be substantially identical in size and configuration, are organized in an array mounted on the rails of the frame 14. Each dispensing bin 30 has a dispensing passage or channel 37 (FIG. 10) that communicates with a portal or outlet (FIG. 10) that faces generally in the same direction to create an access region for the dispensing carrier 26. The identity of the tablets in each bin is known by the controller 12, which can direct the dispensing carrier 26 to transport the container to the proper bin 30. In some embodiments, the bins 30 may be labeled with a bar code, RFID tag or other indicia to allow the dispensing carrier 26 to confirm that it has arrived at the proper bin 30.

The dispensing bins 30 are configured to singulate, count, and dispense the tablets contained therein, with the operation of the bins 30 and the counting of the tablets being controlled by the controller 12. Some embodiments may employ the controller 12 as the device which monitors the locations and contents of the bins 30; others may employ the controller 12 to monitor the locations of the bins, with the bins 30 including indicia (such as a bar code or electronic transmitter) to identify the contents to the controller 12. In still other embodiments, the bins 30 may generate and provide location and content information to the controller 12, with the result that the bins 30 may be moved to different positions on the frame 14 without the need for manual modification of the controller 12 (i.e., the bins 30 will update the controller 12 automatically).

The tablet dispensing station 20 includes a plurality of the manifold assemblies 51. Each manifold assembly 51 includes a manifold 50 (FIG. 3), which may be securely mounted on the frame 14. The vacuum manifold 50 is fluidly connected to the vacuum source V by a suitable conduit or conduits.

After the container C is desirably filled by the tablet dispensing station 20, the dispensing carrier 26 moves the filled container to the closure dispensing station 22. The closure dispensing station 22 may house a bulk supply of closures and dispense and secure them onto a filled container. The dispensing carrier 26 then moves to the closed container, grasps it, and moves it to the offloading station 24.

Figure 3:
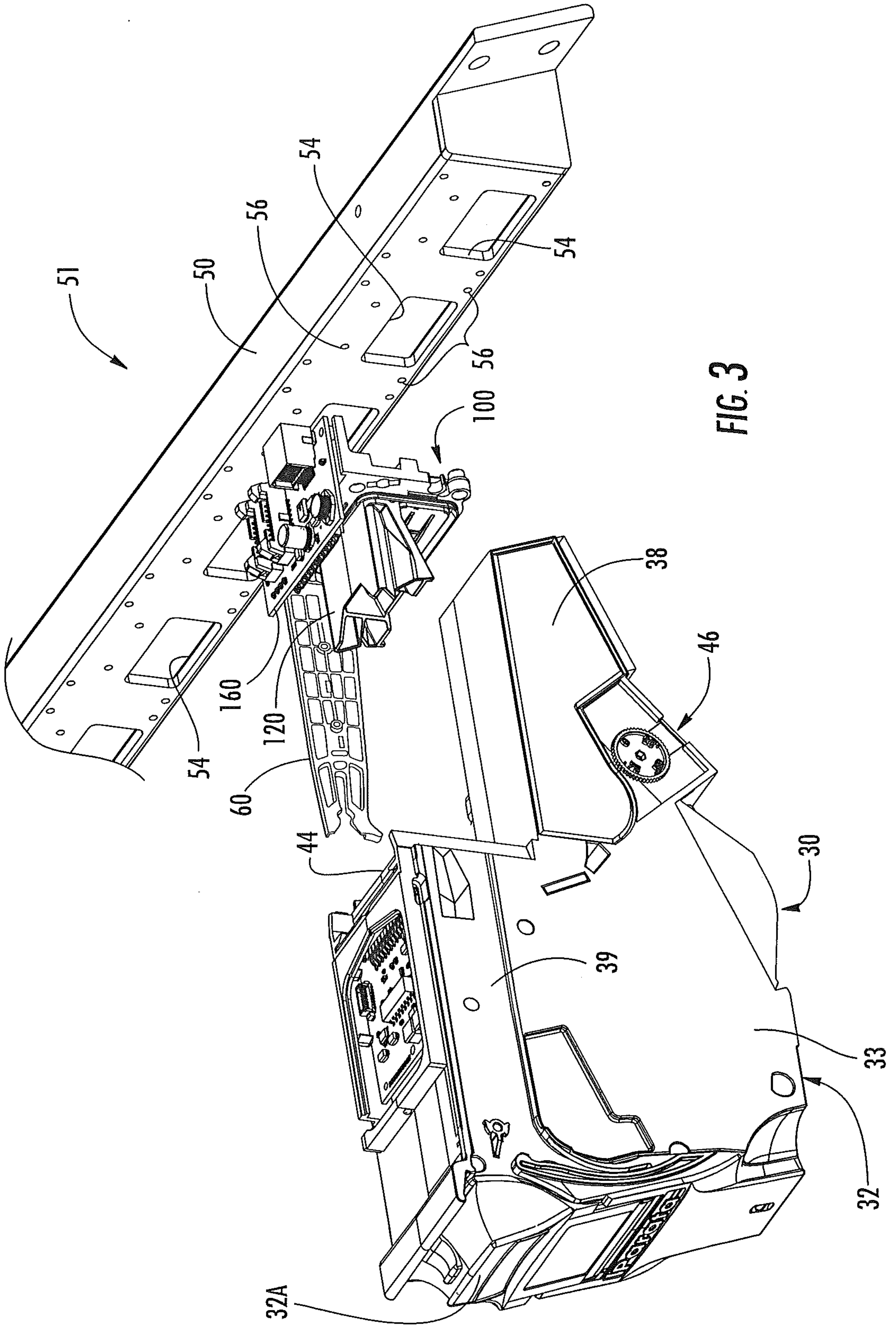
FIG. 3 is an exploded, fragmentary, front perspective view of a dispensing bin and a manifold assembly according to embodiments of the present invention and forming parts of the tablet dispensing system of FIG. 1.

Turning to the bins 30 in more detail, an exemplary bin 30 is shown in more detail in FIGS. 3, 6 and 9-11. The bin 30 may include various features, functionality and operations as described in Karwacki and/or Michelli with regard to the dispensing bins disclosed therein. The bin 30 includes a housing 32 having a hopper portion 33 and a nozzle 38 (FIG. 3). The housing 32 defines a low pressure or vacuum port 34 and a plenum 35 adjacent and in communication with the vacuum port 34. The housing 32 further includes integral bin guide features in the form of laterally opposed inner guide rails 36 (FIGS. 6, 7 and 9) extending longitudinally inwardly from the port 34 and laterally into the plenum 35. Each guide rail 36 has a ramped surface 36A on its lead end (i.e., the end proximate the port 34). A solenoid 40 (FIG. 10) is mounted in the housing 32 and has a drive shaft or arm 42 positioned adjacent the vacuum port 34.

The hopper portion 33 defines a hopper chamber 33A (FIG. 10) that can be filled with tablets T. The bin 30 can be filled or replenished with tablets through an opening located at the upper rear portion of the bin 30. The opening is selectively accessible via a pivoting door 32A, for example, that normally resides in a closed position as shown in FIG. 3 and which can be pivoted open to access the opening.

The tablets T can be dispensed one at a time into the container C (FIG. 8) through a dispensing passage or channel 37 of the bin 30. The dispensing channel 37 has an inlet adjacent and fluidly connecting the channel 37 to the hopper chamber 33A. The dispensing channel 37 includes an outlet downstream from and opposite the inlet and through which tablets may exit to be dispensed into the container C. The bin 30 defines a tablet dispensing path from the inlet, through the dispensing channel 37, through the outlet, and through the nozzle 38. According to some embodiments and as illustrated, the dispensing channel 37 is uniformly rectangular in cross-section from the inlet to the outlet thereof.

The hopper portion 33A has a bottom wall defining a floor. Openings 45 (FIG. 10) extend through the floor. In some embodiments, air or other gas can be induced to flow through the openings 45 (e.g., from the ambient environment) and into the hopper chamber 33A to agitate the tablets T contained therein when a suction force is applied to the bin 30 through the vacuum port 34.

The bin 30 may include an adjustable dispensing channel subassembly 46 (FIG. 3), only a portion of which is shown in the drawings. The adjustable dispensing channel subassembly 46 may be configured as disclosed in U.S. Published Patent Application No. 2008-0283734-A1, the disclosure of which is incorporated herein by reference. According to some embodiments, the heightwise and widthwise dimensions of the dispensing channel 37 can be selectively configured using the adjustment mechanisms of the adjustable dispensing channel subassembly 46.

According to some embodiments, the bin 30 includes a sensor system including one or more radiation detectors (e.g., photodetectors) and radiation emitters (e.g., photoemitters). According to some embodiments, the bin 30 includes a sensor system as disclosed in Applicants' U.S. Published Patent Application No. 2008-0283734-A1. The photodetector(s) may be configured and positioned to detect the tablets T as they pass through the dispensing channel 37. The photodetector(s) can be configured to generate detector signals that are proportional to the light received thereby. The photoemitter(s) may be positioned and configured to generate light that is directed toward the photodetector(s) across the dispensing pathway of the tablets T. In this manner, when a tablet T interrupts the light transmitted from the photoemitter to the photodetector, the detector signal will change based on the reduced light being received at the respective photodetector. According to some embodiments, the controller 12 uses detection signals from the photodetector to count the dispensed tablets, to assess a tablet or tablets, and/or to determine conditions or performance in tablet dispensing. In some cases, the sensor system operates the solenoid 40 or other devices in response to identified or determined count, conditions or performance in dispensing.

Turning to the manifold assembly 51 in more detail, the manifold assembly 51 includes the manifold 50, opposed cradles 60 and a door assembly 100. For the purpose of explanation, the cradles 60 are not shown in FIGS. 4 and 5.

The manifold 50 defines a plenum 52 (FIG. 10) fluidly connected to the vacuum source V. One or more inlet ports 54 (FIG. 3) are defined in the manifold 50 and fluidly communicate with the plenum 52. Mount holes 56 (FIG. 3) are provided on the manifold 50.

The door assembly 100 (FIGS. 3-5 and 9-15) includes a body 110, a cowl or shield member 120, a door 140, an annular outer door gasket 150, an annular inner manifold gasket 156 and a return spring 158. The body 110, the shield 120, and the door 140 may be formed of any suitable material, such as a rigid polymeric material (e.g., ABS or polycarbonate). According to some embodiments, the body 110 is monolithic.

Figure 4:
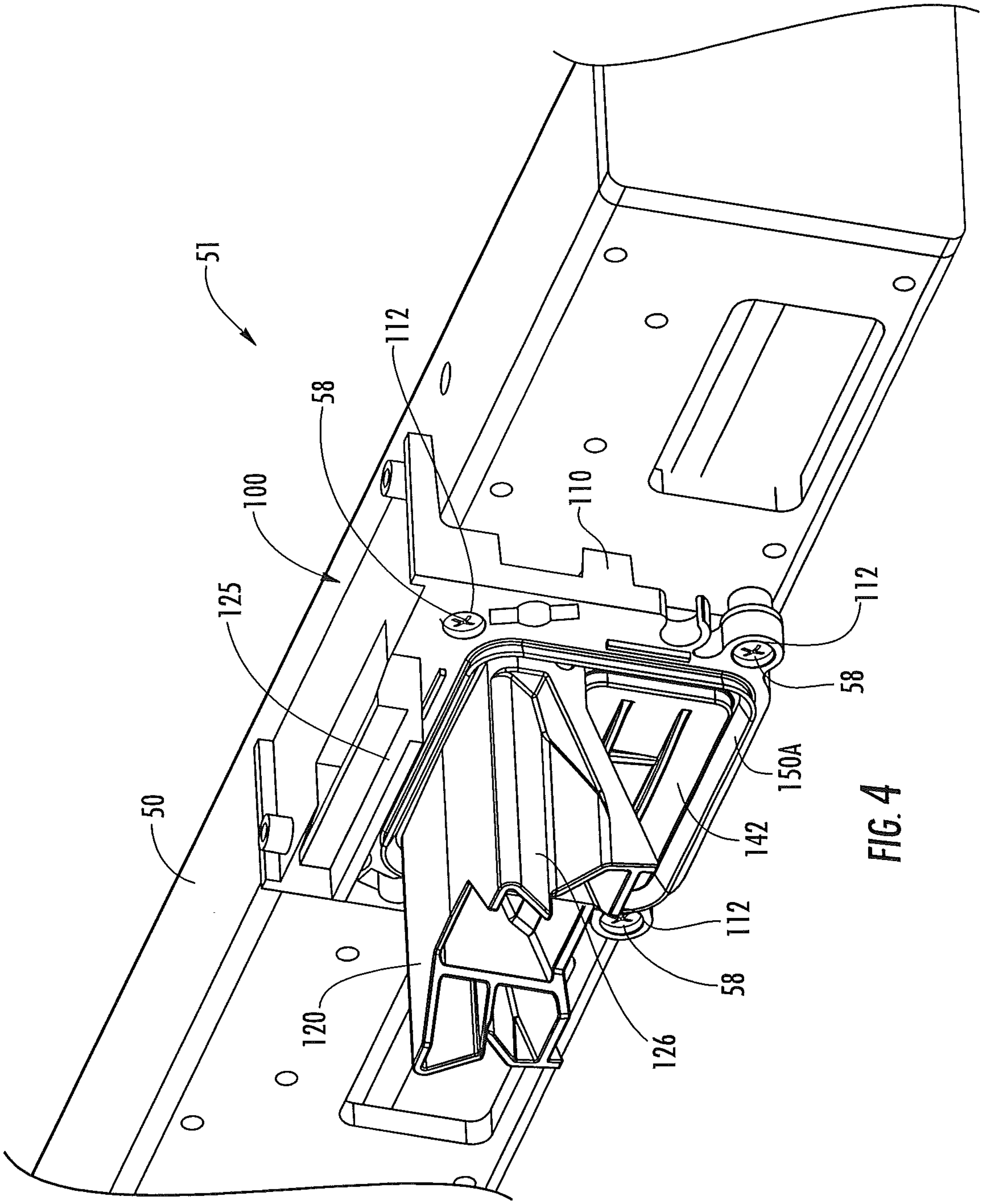
FIG. 4 is a fragmentary, front perspective view of the manifold assembly of FIG. 3.
Figure 5:
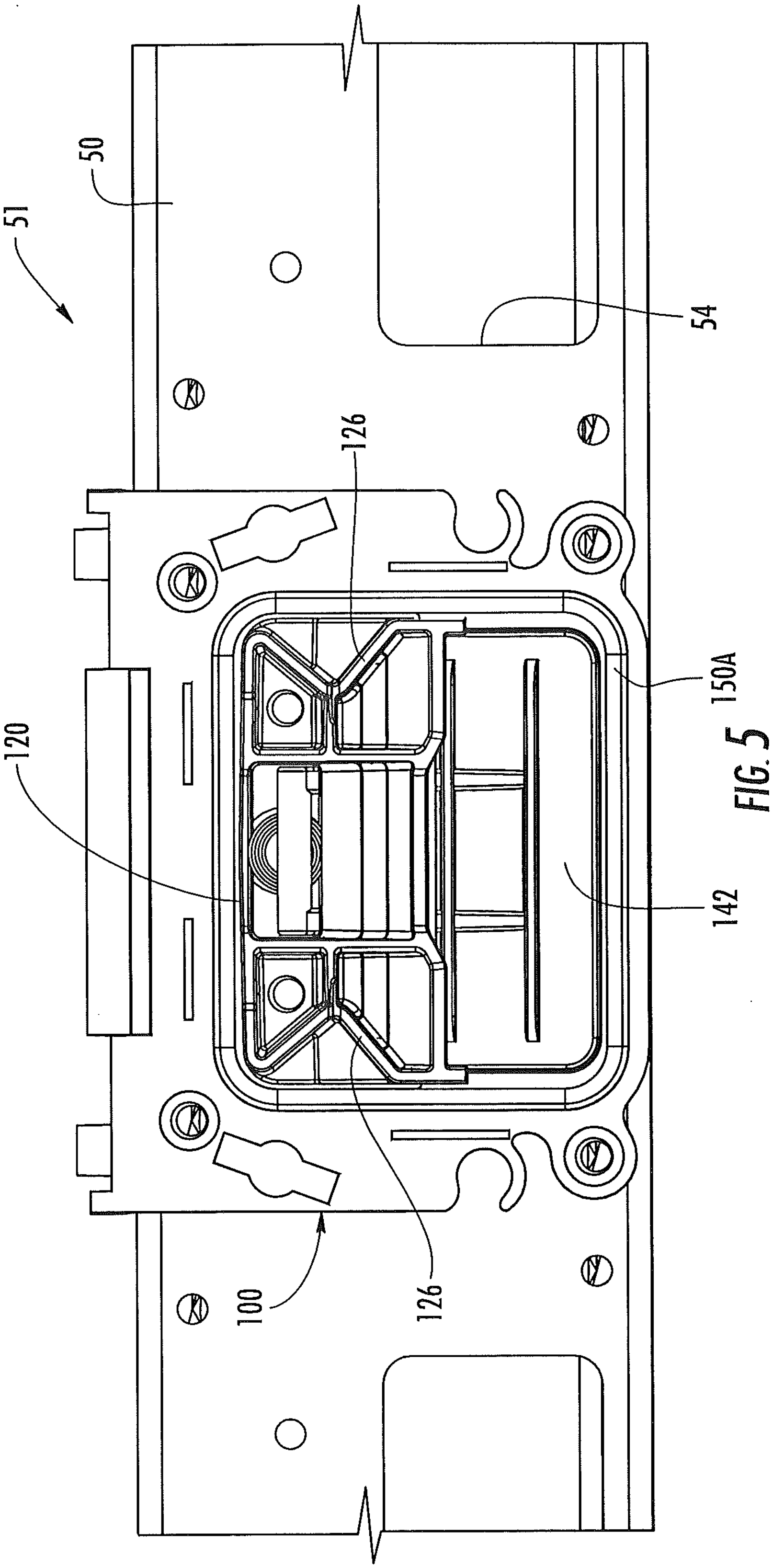
FIG. 5 is a fragmentary, front plan view of the manifold assembly of FIG. 3.
Figure 6:
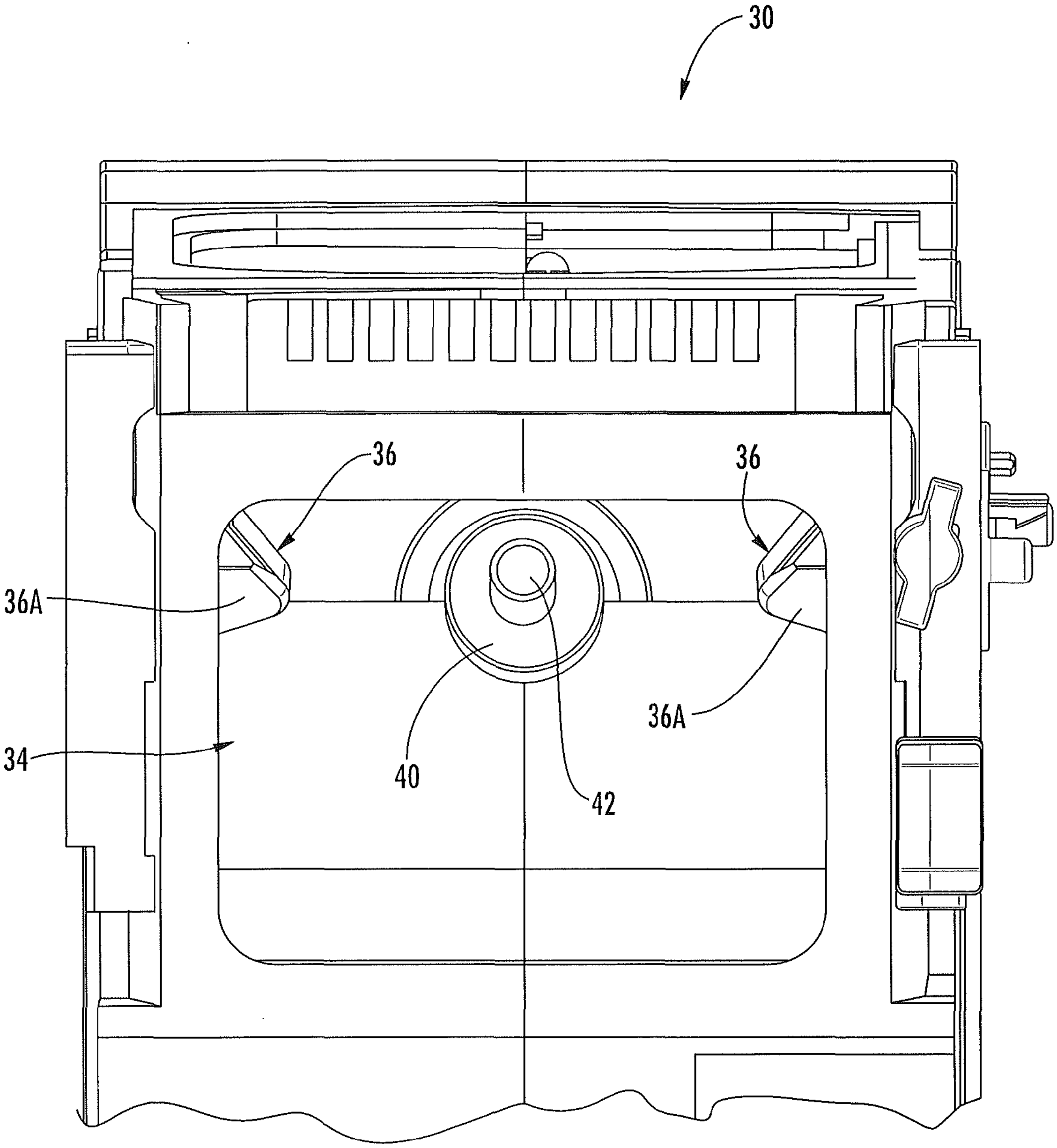
FIG. 6 is a fragmentary, rear plan view of the dispensing bin of FIG. 3.
Figure 7:
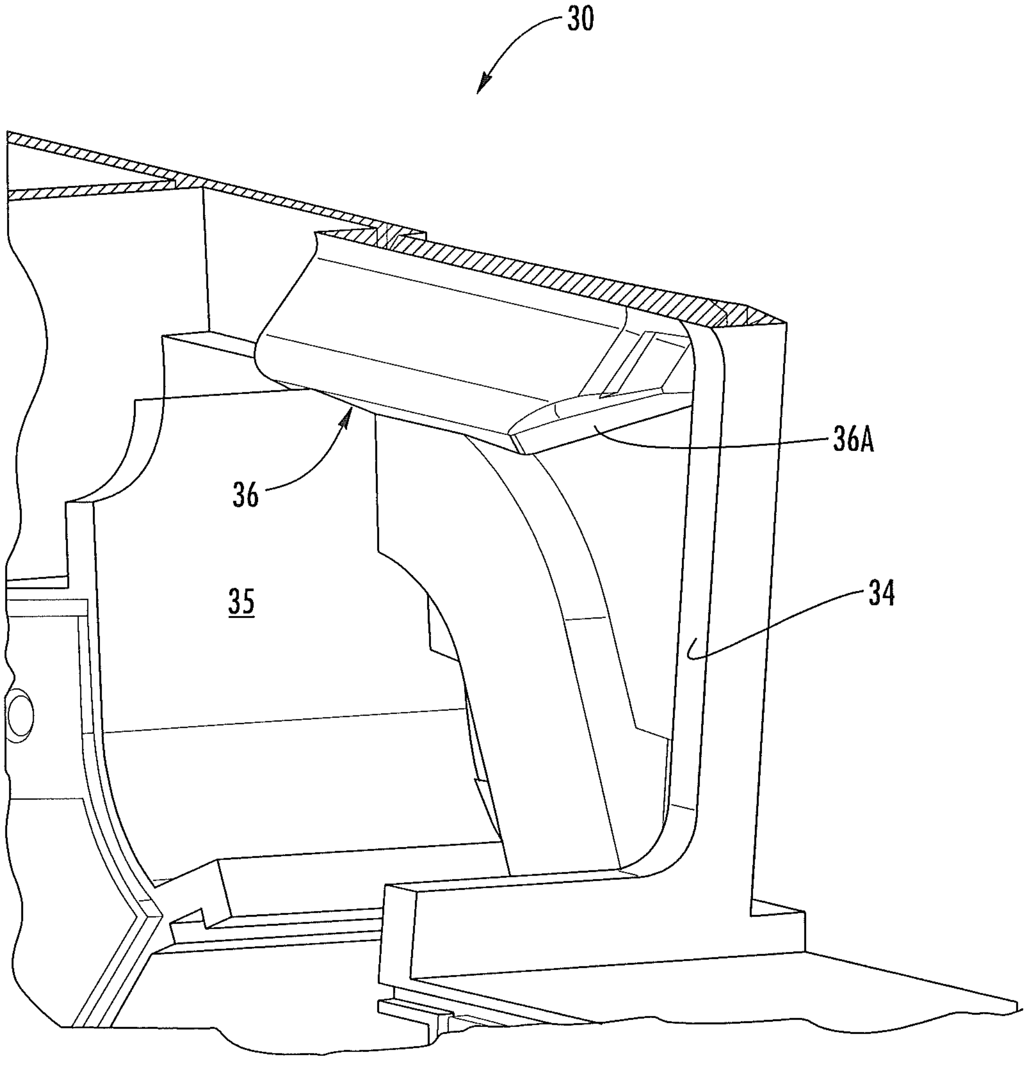
FIG. 7 is a fragmentary, rear perspective view of the dispensing bin of FIG. 3.

The door assembly 100 is firmly secured or affixed to the manifold 50 by fasteners (e.g., bolts 58; FIG. 4) that extend through fastener holes 112 in the body 110 and the mount holes 56, for example. The body 110 has an inner flange 114A (FIG. 11) seated in the port 54 such that an doorway passage or opening 114 defined by the body 110 is aligned and in fluid communication with the port 54. The body 110 further defines a hinge recess 118 (FIG. 13) and includes a connector support 125.

The inner gasket 156 (FIG. 13; e.g., formed of an elastomeric material such as silicone rubber) is seated in an annular groove 117 and compressed between the body 110 and the manifold 50 to effect an airtight or resistant seal. The outer gasket 150 (FIG. 13; e.g., formed of an elastomeric material such as silicone rubber) is seated in an annular groove 116 and, in use, is compressed between the body 110 and the bin 30 to effect an airtight or resistant seal. The outer gasket 150 has an annular bin seal portion 150A and an annular door seal portion 150B. The inner gasket 156 and the outer gasket 150 may be integrally formed. According to some embodiments, the grooves 116 and 117 are fluidly connected by one or more flow channels through the body 110 and the gaskets 156, 150 are injection molded into the body 110.

Figure 13:
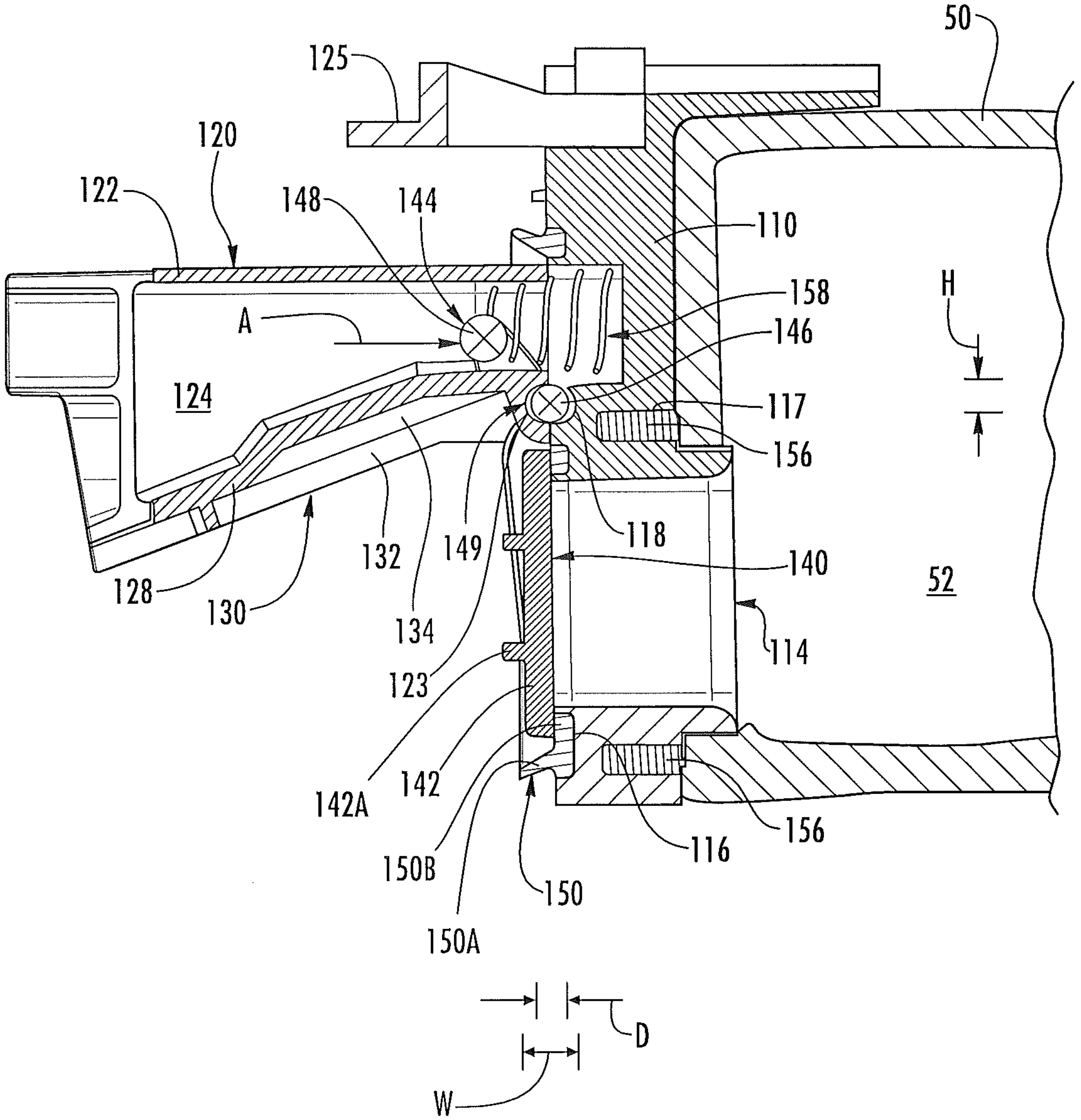
FIG. 13 is an enlarged, fragmentary, cross-sectional view of the dispensing bin and the manifold assembly of FIG. 8 taken along the line 10-10 of FIG. 8 wherein the door of the door assembly is in the closed position.

The shield 120 (FIGS. 4 and 13) includes a generally tubular body 122 defining a hinge recess 123, an arm passage 124, manifold guide features in the form of opposed longitudinally extending guide grooves 126, and a bottom wall 128. A door pocket 130 is defined in the lower face 128A of the bottom wall 128. The illustrated door pocket 130 has an outer portion 132 and a relatively reduced or smaller inner portion 134; however, other suitable shapes may be employed in accordance with the configuration of the door 140 and door panel 142. The shield 120 may be separately formed from and subsequently secured to the body 110 to form a hinge channel, slot or cavity 149 (FIG. 13) collectively defined by the hinge recesses 118 and 123 (FIG. 13). According to some embodiments, the hinge channel 149 is oblong.

The door 140 includes a door panel 142 and a hinge arm 144. The door panel 142 may include standoffs or ribs 142A. The hinge arm 144 (FIG. 13) includes a pivot rod portion 146 and an actuator portion 148. The ribs 142A may serve as reinforcement structures and/or to prevent suction between the shield 120 and the door panel 142.

The spring 158 is captured between the arm 144 and the body 110 to urge or bias the actuator portion 148 away from the body 110.

Figure 8:
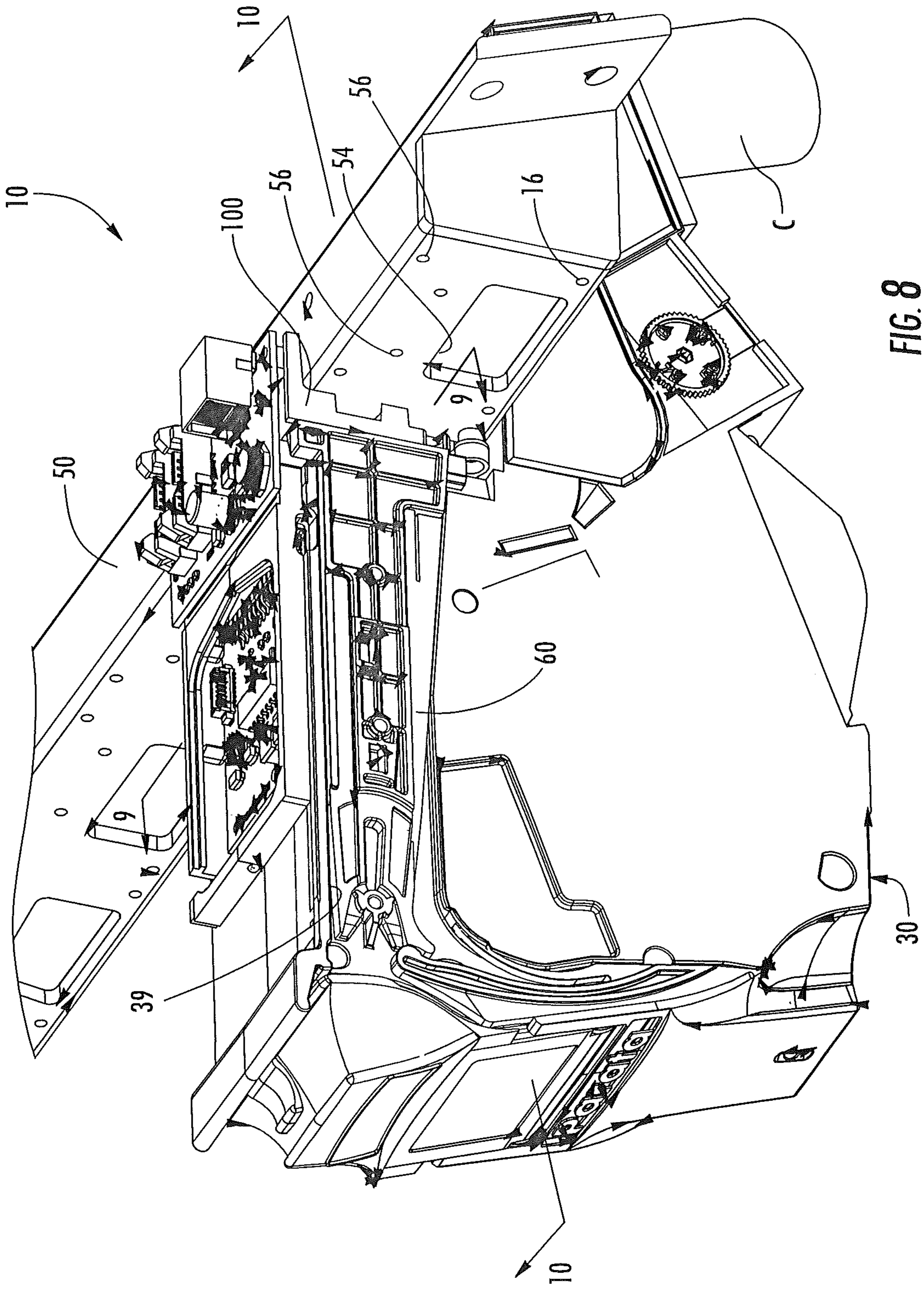
FIG. 8 is fragmentary, front perspective view of the dispensing bin and the manifold assembly of FIG. 3 wherein the dispensing bin is operatively mounted on the manifold assembly.

The cradles 60 are secured to the body 110 as shown in FIGS. 3 and 8 (for the purpose of explanation, the near-side cradle 60 is not shown in FIG. 3). In use, the cradles 60 may support a significant portion, most or substantially all of the weight of the bin 30. The cradles 60 may be formed of any suitable material and in any suitable configuration to support the bin 30. As shown, the cradles 60 are each received in a respective cradle slot 39 (FIG. 3) defined in a side of the bin 30.

Figure 9:
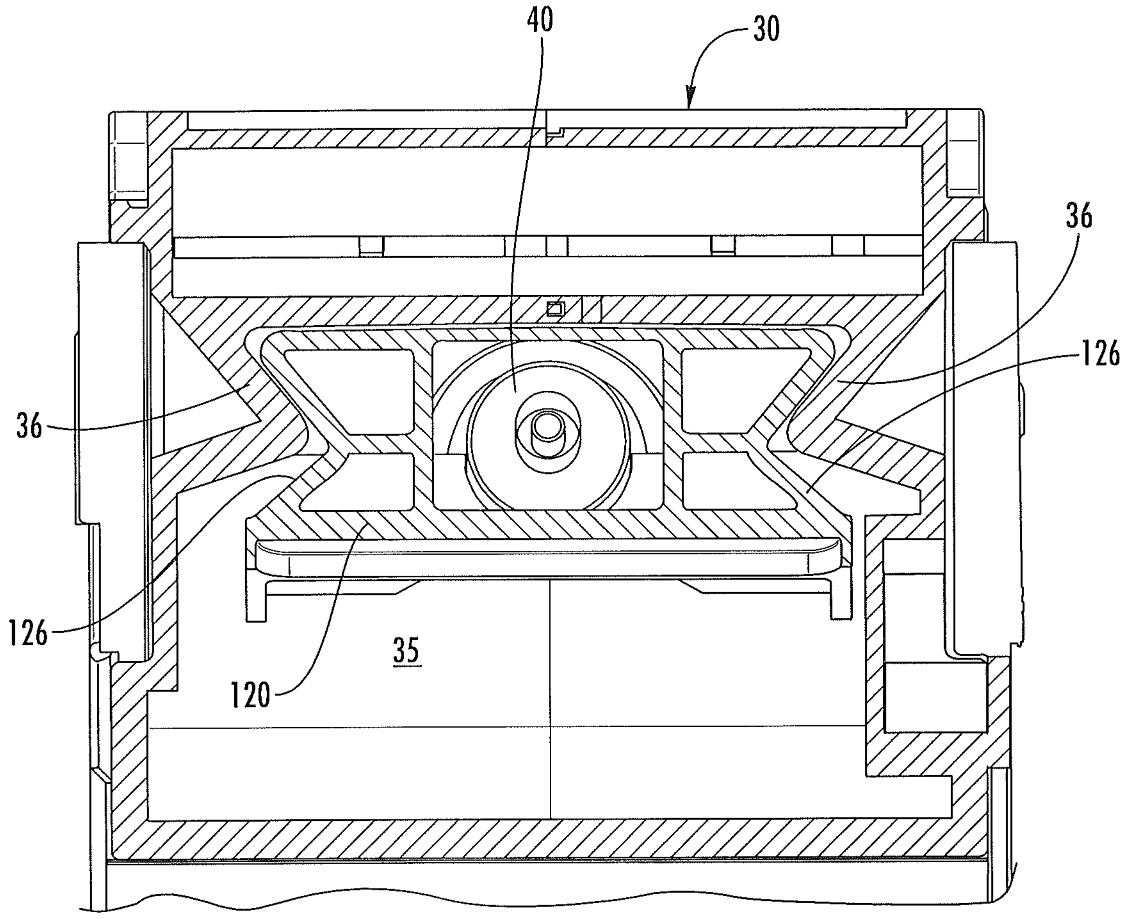
FIG. 9 is a cross-sectional view of the dispensing bin and the manifold assembly of FIG. 8 taken along the line 9-9 of FIG. 8.
Figure 11:
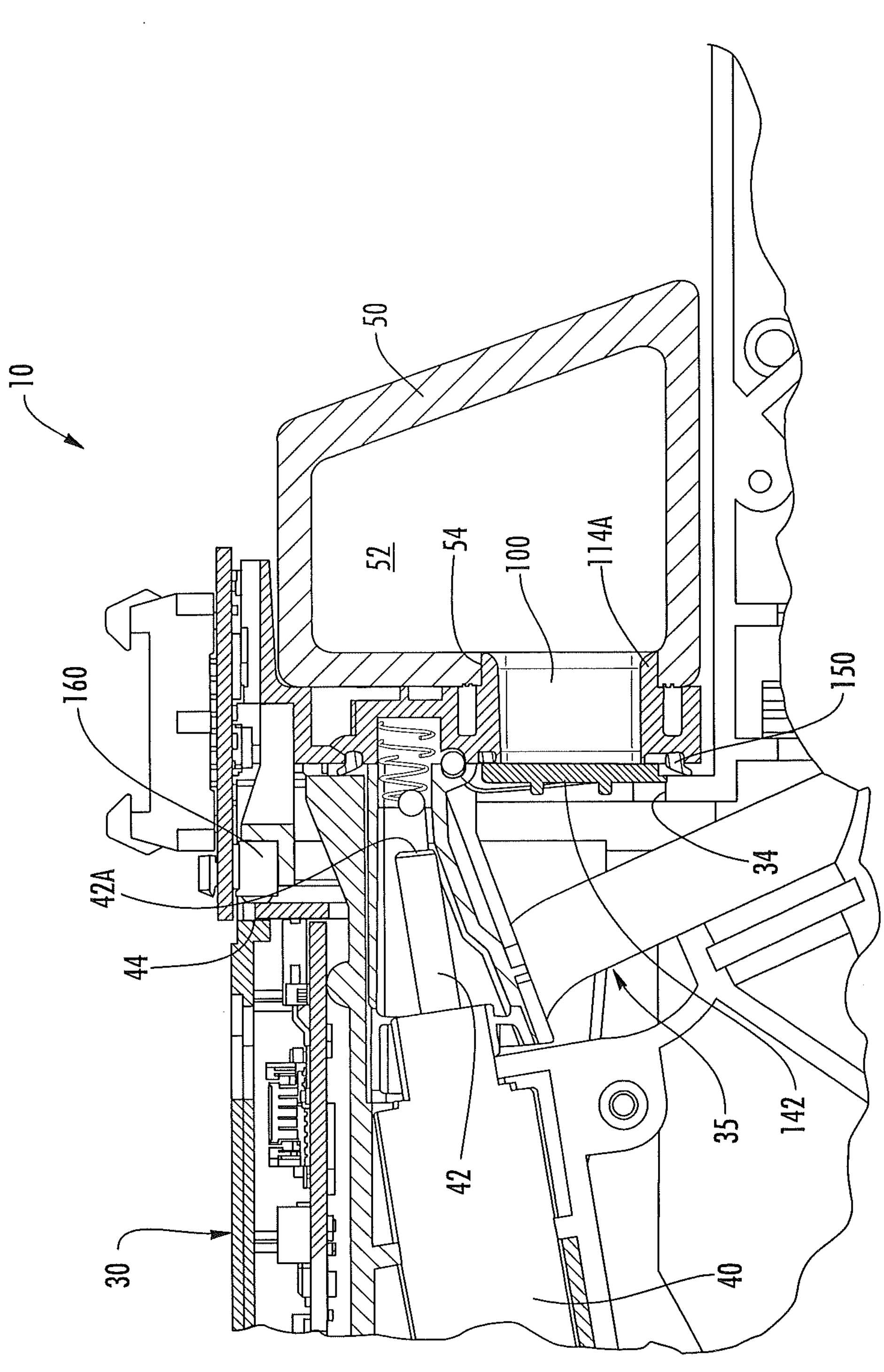
FIG. 11 is an enlarged, fragmentary, cross-sectional view of the dispensing bin and the manifold assembly of FIG. 8 taken along the line 10-10 of FIG. 8.
Figure 12:
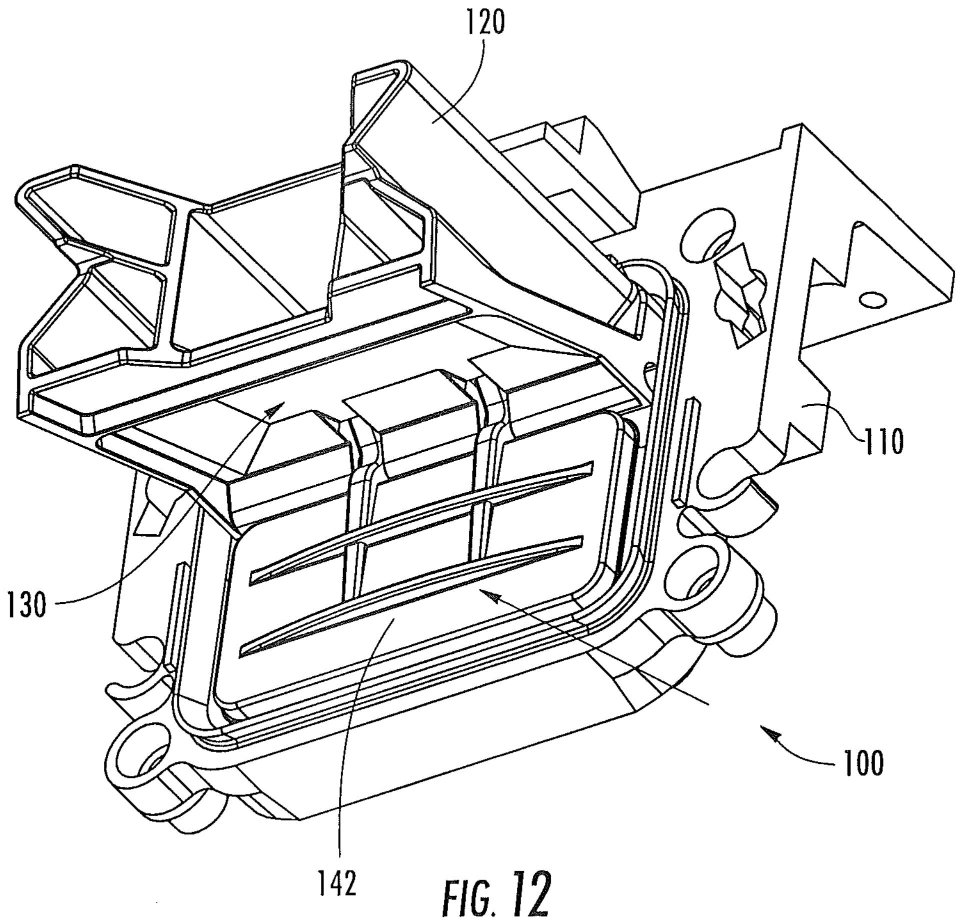
FIG. 12 is bottom, front perspective view a door assembly forming a part of the manifold assembly of FIG. 3 wherein a door of the door assembly is in a closed position.

In use, the bin 30 is mounted on the manifold 50 by sliding the bin low pressure port 34 over the shield 120 and such that the cradles 60 are received in the cradle slots 39. The opposed guide rails 36 enter respective ones of the opposed guide grooves 126 as shown in FIG. 9 to positively guide or direct the bin 30 into proper alignment with the selected manifold inlet port 54. According to some embodiments, the shapes of the rails 36 are fully or partially complementary to the shapes of the grooves 126. The ramped walls 36A may assist in initiating alignment between the rails 36 and the grooves 126. According to some embodiments, the bin 30 is also guided and/or supported by a cradle or similar components of the support frame. The front face of the bin 30 surrounding the port 34 engages and compresses the gasket 150 to form a seal. The solenoid arm 42 extends through the passage 124 so that a terminal end 42A thereof is at or proximate the actuation portion 148 of the hinge arm 144 (FIG. 11). The connector 44 of the bin 30 may operatively engage an electrical connector 160 (FIGS. 3 and 11) mounted on the connector support 125.

With the bin 30 installed on the manifold 50, the door 140 can be selectively opened and closed as described in Karwacki and/or Michelli, for example. With reference to FIGS. 10-13, the door 140 is shown therein in a closed position. The solenoid arm 42 is retracted and the door 140 is maintained in the closed position by the return spring 158 and the force vacuum force in the plenum 52. The door panel 142 is stopped, restricted or limited in travel by abutment with the gasket 156 and the front face of the body 110. In the closed position, the door panel 142 restricts or substantially prevents the flow of air through the doorway passage 114 and the inlet port 54.

Figure 14:
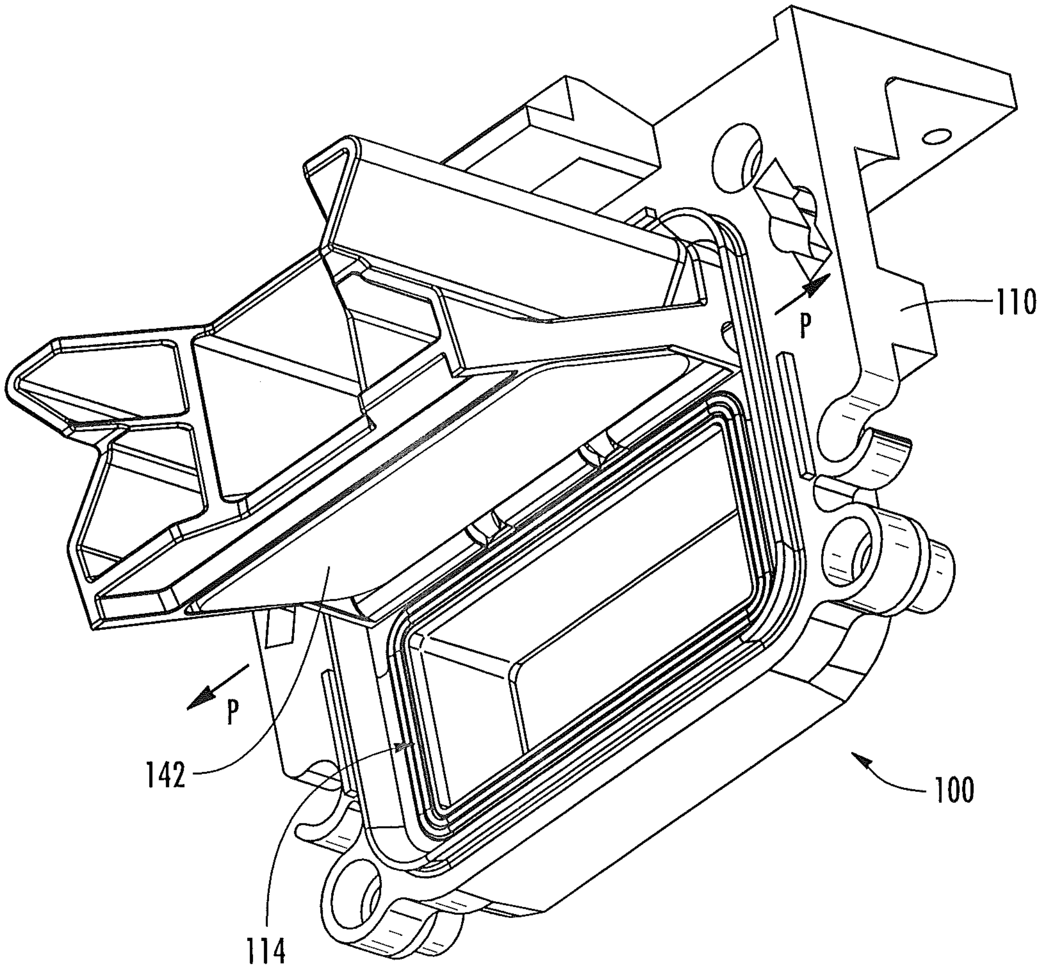
FIG. 14 is bottom, front perspective view the door assembly of FIG. 12 wherein the door of the door assembly is in an open position.
Figure 15:
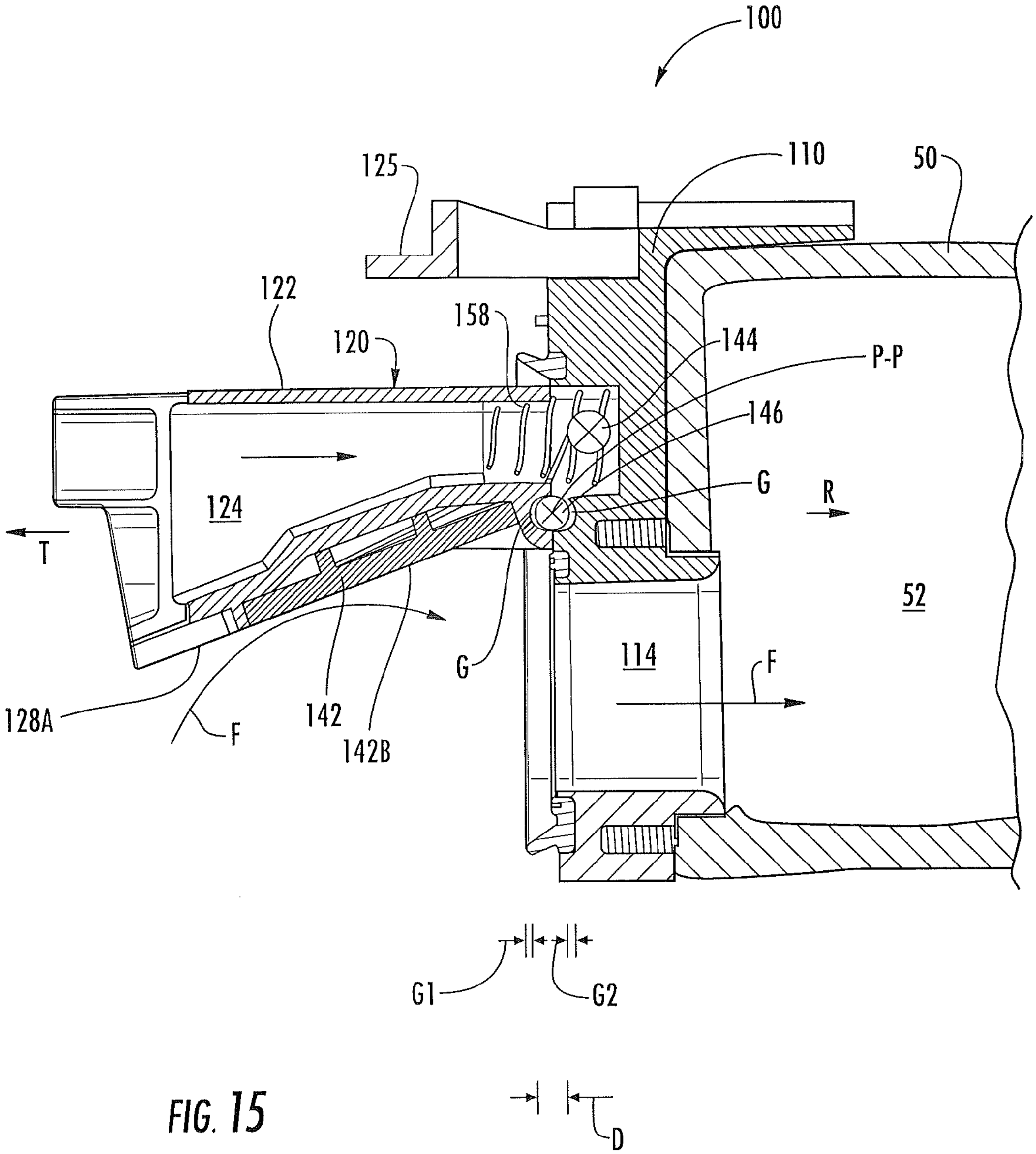
FIG. 15 is an enlarged, fragmentary, cross-sectional view of the dispensing bin and the manifold assembly of FIG. 8 taken along the line 10-10 of FIG. 8 wherein the door of the door assembly is in the open position.

When it is desired to provide the negative pressure and vacuum-induced flow to the bin 30, the solenoid 40 is actuated to drive the arm 42 against the actuator portion 148 (FIG. 13). The door panel 142 is thereby pivoted upward and away from the opening 114 about the pivot rod portion 146 as indicated by the direction arrow A (FIG. 13). The door panel 142 is driven until is assumes an open position wherein the door panel 142 seats or nests in the door pocket 130, as shown in FIGS. 14 and 15. In the open position, the door panel 142 permits the flow of air through the doorway passage 114 and the inlet port 54. According to some embodiments, when the door panel 142 is in the open position, the inner face 142B of the door panel 142 is substantially coplanar with or inset from the lower face 128A of the bottom wall (FIG. 15).

The door panel 142 can be returned to the closed position by retracting the solenoid arm 42. Retracting the solenoid arm 42 allows the spring force from the spring 158 to force or break the door panel 142 away from the door pocket 130 and permits gravity to close the door panel 142 onto the gasket 150. The vacuum V draws a negative pressure in the plenum 52, which draws the door panel 142 tightly against the gasket 150. The ribs 142A on the outer face of the door panel 142 may prevent or reduce suction force between the door panel 142 and the shield 120 when the door panel 142 is seated in the door pocket 130 and in contact with the shield 120.

Referring to FIG. 13, it can be seen that the hinge channel 149 is oversized relative to the diameter D of the pivot rod portion 146. More particularly, in some embodiments, the height H (FIG. 13) of the hinge channel 149 is slightly greater than the diameter D of the portion 146 and the width W of the hinge channel 149 is greater than the diameter D so that a gap G (FIG. 15) is present on one or both lateral sides of the pivot rod portion 146. This permits the pivot axis P-P (FIGS. 14 and 15) of the door 140 to float or move laterally fore and aft relative to the front face of the body 110 in a forward direction R and a rearward direction T (FIG. 15). As a result, when the door 142 panel is closed, the pressure of the door panel 142 on the gasket portion 150B is more evenly distributed to provide a more effective seal. According to some embodiments, the gaps G have a combined width (i.e., width G1 plus width G2; FIG. 15) of at least 0.020 inch and, in some embodiments, between about 0.020 inch and 0.030 inch. According to some embodiments, the vertical clearance between the portion 146 and the hinge channel 149 is between about 0.005 and 0.010 inch.

The manifold assembly 51 and door assembly 100 can provide a number of advantages.

By nesting the open door panel 142 in the pocket 130, the door assembly 100 prevents all or a substantial portion of the airflow F (FIG. 15) into the manifold 10 from flowing to the backside of (i.e., around and behind) the door panel 142, where the air flow would tend to force the door panel 142 toward the closed position. As a result, the force requirements (e.g., solenoid load) to maintain the door panel 142 open are reduced. The associated costs and space requirements may thereby be reduced as well.

The shield 120 and the guide features 36 and 126 can assist in aligning the bin 30 with the manifold 10. These features may also stabilize the bin 30 with respect to the manifold 10 when the bin 30 is installed. In particular, these features may resist displacement of the bin 30 when the bin 30 is subjected to forces during dispensing operations (e.g., when a robot pushes a vial upwardly against the dispensing nozzle of the bin 30).

The door assembly 100 also provides a positive stop for the door panel 142.

The door assembly 100 can provide the foregoing functionality in an integral assembly, which may reduce manufacturing costs. For example, the door assembly 100 can provide an integral assembly including a door, alignment and stabilizer features, and sealing gaskets that can be mounted on the manifold 50 as a unit.

Exemplary operation of the dispensing system 10, including more particular operation of the bin 30 and the manifold assembly 51, will now be described.

The bin 30 is filled with tablets T to be dispensed (the bin 30 may or may not be installed on the manifold assembly 51 at this time). If necessary, the adjustable dispensing channel subassembly 46 is suitably adjusted to provide the dispensing channel 37 with the appropriate dimensions for singulating the intended tablets T. The tablets T are initially at rest on the floor of the hopper chamber 33A. At this time, the door 140 of the door assembly 100 is closed.

The bin 30 is installed on the door assembly 100 as described above so that the shield 120 is received through the vacuum port 34 and the bin 30 is cooperatively guided onto the door assembly 100 by engagement between the guide rails 36 and the guide grooves 126.

When it is desired to dispense the tablets T to fill the container C, the dispensing carrier 26, directed by the controller 12, moves the container C to the exit port 38A of the nozzle 38 of the selected dispensing bin 30.

The solenoid 40 is actuated to open the door panel 142 to fluidly couple the bin 30 to the vacuum source V. The vacuum source V is thereby placed in fluid communication with the vacuum port 34 via the manifold 50. According to some embodiments, the pressure of the vacuum at the port 34 is less than about −2 psi and, according to some embodiments, in the range of from about −0.5 to −5 psi. The suction from the vacuum source V applies a negative pressure to the bin 30 to generate one or more air flows, depending on the configuration of the bin 30 and the selected mode of operation.

In some embodiments, the bin 30 is configured to permit (when the door panel 142 is opened) the vacuum source V to draw or induce an intake or agitation flow FA (FIG. 10) of ambient air to flow into the hopper chamber 33A through the floor openings 45. The agitation air flow FA lofts or otherwise displaces (i.e., agitates) the tablets T in the hopper chamber 33A proximate the inlet to the dispensing channel 37. The agitation flow FA exits the bin via the plenum 35, the vacuum port 34, and the inlet port 54 to the vacuum source V. The bin 30 may be operated in this manner (in an "idle" mode) without conveying tablets T in either direction through the dispensing passage 37 until the container C is brought into position against the nozzle 38 to be filled.

Figure 10:
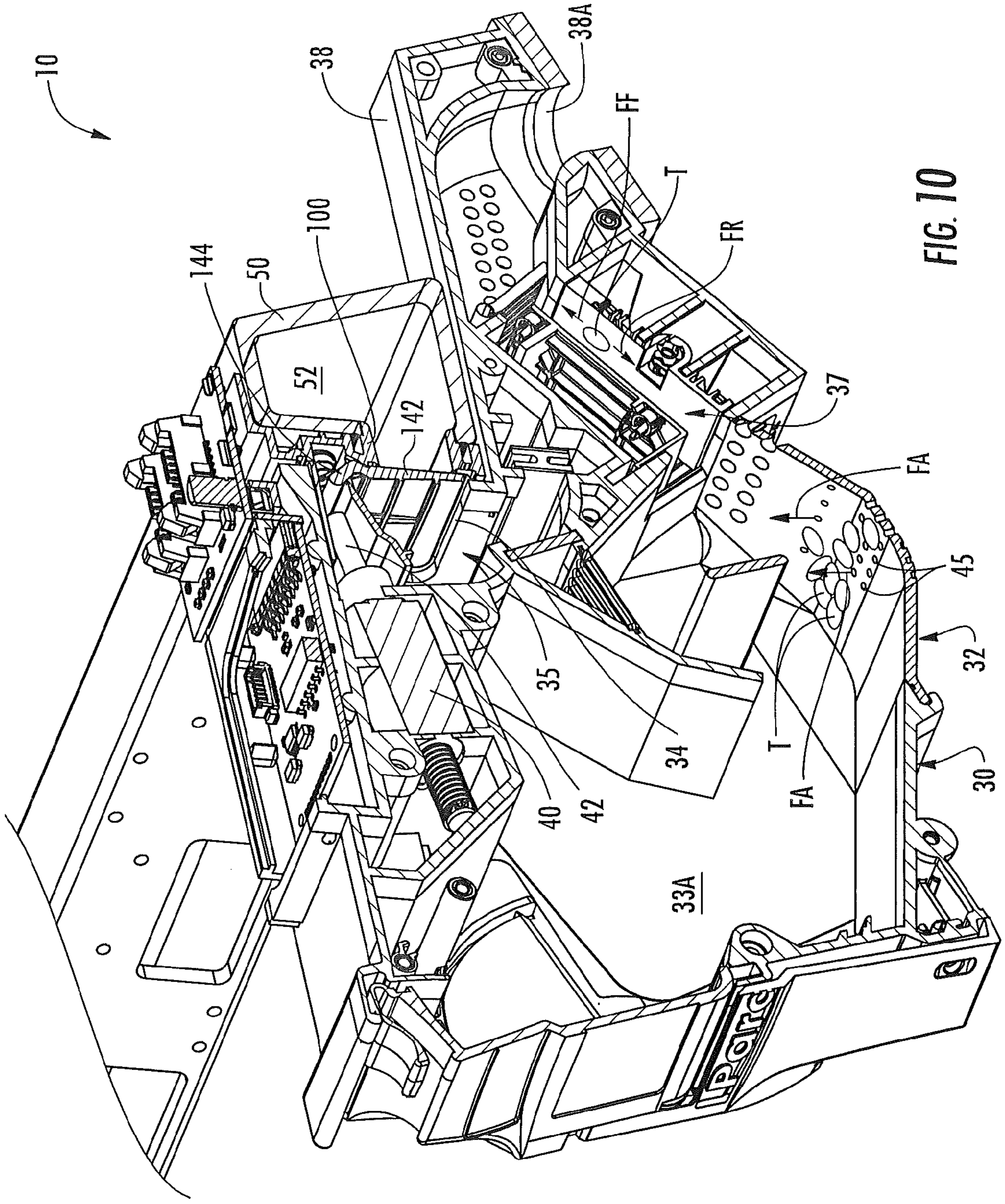
FIG. 10 is a cross-sectional, perspective view of the dispensing bin and the manifold assembly of FIG. 8 taken along the line 10-10 of FIG. 8.

In some embodiments, the bin 30 is configured to permit (when the door panel 142 is opened) the suction from the vacuum source V to apply a negative pressure to the bin 30 to generate a high velocity forward dispensing flow FF (FIG. 10). The forward dispensing flow FF passes through the dispensing channel 37 and entrains and forces or drives the tablets T through the dispensing channel 37 toward the container C. The tablets T may be oriented into a preferred orientation and singulated by the shape of the inlet to the dispensing channel 37. All or a portion of the forward dispensing flow FF may continue through the plenum 35, the vacuum port 34, and the inlet port 54 to the vacuum source V. In some embodiments, the bin 30 is also configured such that the vacuum also causes or induces the agitation flow FA of ambient air to flow into the hopper chamber 33A through the floor openings 45 to agitate the tablets T in the hopper chamber 33A as described above to provide tablet agitation simultaneously with the dispensing flow FF. The agitation flow FA can continue as an agitation return flow through the plenum 35, the vacuum port 34, and the inlet port 54 to the vacuum source V.

In some embodiments, the bin 30 is configured to permit (when the door panel 142 is opened) the suction from the vacuum source V to apply a negative pressure to the bin 30 to generate a high velocity reverse drive flow FR (FIG. 10). The reverse drive flow FR passes through the dispensing channel 37 in a direction opposite that of the forward dispensing flow FF and entrains and forces or drives the tablets T through the dispensing channel 37 toward the hopper chamber 33A. The reverse drive flow FR may be implemented at the end of each dispensing session to clear the dispensing channel 37.

In some embodiments, the bin 30 is also configured such that the vacuum also causes or induces the agitation flow FA of ambient air to flow into the hopper chamber 33A through the floor openings 45 to agitate the tablets T in the hopper chamber 33A as described above to provide tablet agitation simultaneously with the reverse drive flow FR.

During a dispensing cycle (i.e., when the forward dispensing flow is being generated), the controller 12 may determine that a tablet jam condition is or may be present. A tablet jam is a condition wherein one or more tablets are caught up in the bin 30 such that tablets T will not feed into or through the dispensing channel 37 under the pressure of the forward dispensing flow FF. Tablets may form a jam at the nozzle inlet or elsewhere so that no tablets are sensed passing through the dispensing channel 37 for a prescribed period of time while the forward air flow is being generated. When a tablet jam is identified by the controller 12, the controller 12 will issue a "jam clear" or "backjet" and reconfigure the bin 30 to generate the reverse drive flow FR and the agitation flow FA to clear a perceived tablet jam. These air flows may serve to dislodge any such jams as well as to loosen the tablets in the hopper chamber 33A.

Typically, an operator will request that a desired number of tablets be dispensed ("the requested count"). The sensor system can detect the tablets T as they pass through predetermined points in the dispensing channel 37. The controller 12 may use the detection signals from the photodetectors to monitor and maintain a registered count of the tablets T dispensed ("the system count"). When the system count matches the requested count, the controller 12 will deem the dispensing complete and cease dispensing of the tablets T by reconfiguring the bin 30 and/or closing the vacuum manifold door 140.

The foregoing flows and modes can be selectively and alternately executed by the controller 12 to dispense one or more the tablets T as desired. While exemplary embodiments have been described, it will be appreciated that bins 30 having other functionality and mechanisms may be employed with a manifold assembly of the present invention. Michelli discloses exemplary bins that utilize suction to generate agitation flows, forward dispensing flows, and reverse drive flows and may be used cooperatively with the manifold assembly 51 (with suitable modifications). Alternatively, the bin may be configured to utilize the suction from the manifold 50 to generate an agitation flow (i.e., corresponding to the agitation flow FA) while using a positive air pressure or flow source to generate the forward dispensing flow FF and/or the reverse drive flow FR (for example, as disclosed in Karwacki).

It is noted that any one or more aspects or features described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner These and other objects and/or aspects of the present invention are explained in detail in the specification set forth herein.

The foregoing is illustrative of the present invention and is not to be construed as limiting thereof. Although a few exemplary embodiments of this invention has been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed is:

1. An apparatus for dispensing solid articles, the apparatus comprising:
- a manifold assembly including:
  - a manifold having a plenum and an inlet port in fluid communication with the plenum; and
  - a door assembly including:
    - a door panel selectively moveable between a closed position, wherein the door panel restricts airflow through the inlet port, and an open position, wherein the door panel permits airflow through the inlet port; and
    - at least one integral manifold guide feature; and
- a dispensing bin having a dispensing bin port and including at least one integral dispensing bin guide feature;
- wherein the dispensing bin is removably mounted on the manifold assembly such that:
  - the at least one integral manifold guide feature releasably engages the least one integral dispensing bin guide feature to align the dispensing bin with the manifold assembly;
  - when the door panel is in the closed position, the door panel restricts airflow through the dispensing bin port; and
  - when the door panel is in the open position, the door panel permits airflow through the dispensing bin port.

2. The apparatus of claim 1 wherein the door assembly includes a spring member biasing the door panel into the closed position.

3. The apparatus of claim 1 wherein:
- the door assembly includes a body and an integral manifold gasket mounted on the body; and
- the manifold gasket surrounds the inlet port and forms an airtight seal between the body and the manifold.

4. The apparatus of claim 1 wherein:
- the door assembly includes a body and an integral door gasket mounted on the body; and
- the door gasket surrounds the inlet port and forms an airtight seal between the body and the door panel when the door panel is in the closed position.

5. The apparatus of claim 4 wherein the door gasket includes:
- a first gasket portion configured to form the airtight seal between the body and the door panel when the door panel is in the closed position; and
- a second gasket portion configured to engage a dispensing bin when the dispensing bin is mounted on the manifold assembly and to thereby form an airtight seal between the body and the dispensing bin.

6. The apparatus of claim 1 wherein:
- the door assembly includes a body defining a hinge channel and having a sealing face;
- the door assembly includes a door including the door panel and a pivot rod portion pivotally mounted in the hinge channel to permit the door panel to pivot about a pivot axis between the open and closed positions; and
- the hinge channel is oversized relative to the pivot rod portion so that the pivot axis can float fore and aft with respect to the sealing face.

7. The apparatus of claim 1 wherein the door assembly includes:
- a body having a connector mount portion; and
- an electrical connector mounted on the connector mount portion and configured to operatively engage an electrical connector on a dispensing bin.

8. The apparatus of claim 1 wherein the at least one integral manifold guide feature includes a pair of opposed guide features, wherein each of the pair of manifold guide features includes an elongate guide rail or an elongate guide groove.

9. The apparatus of claim 1 including a vacuum source fluidly connected to the manifold such that, when the door panel is in the open position, the vacuum source is operable to provide a suction flow at the inlet port.

10. An apparatus for dispensing solid articles, the apparatus comprising a manifold assembly including:
- a manifold having a plenum and an inlet port in fluid communication with the plenum; and
- a door assembly including:
  - a door panel selectively moveable between a closed position, wherein the door panel restricts airflow through the inlet port, and an open position, wherein the door panel permits airflow through the inlet port;
  - a shield defining a pocket to receive the door panel in the open position and thereby reduce or restrict flow of air behind the door panel; and
- a dispensing bin having a dispensing bin port, wherein the dispensing bin is removably mounted on the manifold assembly such that, when the door panel is in the closed position, the door panel restricts airflow through the dispensing bin port, and when the door panel is in the open position, the door panel permits airflow through the dispensing bin port;

wherein:

the dispensing bin includes at least one integral dispensing bin guide feature; and the door assembly includes at least one integral manifold guide feature releasably engaging the least one integral dispensing bin guide feature to align the dispensing bin with the manifold assembly.

11. The apparatus of claim 10 wherein:

the door assembly includes an actuator portion connected to the door panel and operable to transition the door panel between the open and closed positions; and the shield defines a shield passage extending therethrough and configured to receive an actuator of a dispensing bin mounted on the door manifold assembly such that the actuator can selectively displace the actuator portion to open and close the door panel.

12. The apparatus of claim 10 wherein:

the door assembly includes a body defining a doorway passage and the shield is integral with the body; and the manifold guide features are integrally formed in the shield.

13. The apparatus of claim 10 wherein:

the dispensing bin defines a dispensing bin plenum adjacent the dispensing bin port; and the shield is disposed in the plenum.

14. A method for dispensing solid articles, the method comprising:

providing a dispensing apparatus including:

a manifold assembly including:

a manifold having a plenum and an inlet port in fluid communication with the plenum; and a door assembly including:

a door panel selectively moveable between a closed position, wherein the door panel restricts airflow through the inlet port, and an open position, wherein the door panel permits airflow through the inlet port; and at least one integral manifold guide feature; and a dispensing bin having a dispensing bin port and including at least one integral dispensing bin guide feature; and removably mounting the dispensing bin on the manifold assembly such that:

when the door panel is in the closed position, the door panel restricts airflow through the dispensing bin port; and when the door panel is in the open position, the door panel permits airflow through the dispensing bin port; and selectively moving the door panel between the open and closed positions to control airflow through the inlet port;

wherein removably mounting the dispensing bin on the manifold assembly includes releasably engaging the least one dispensing bin guide feature with the at least one manifold guide feature to align the dispensing bin with the manifold assembly.

15. The method of claim 14 wherein the door assembly includes a shield defining a pocket to receive the door panel in the open position and thereby reduce or restrict flow of air behind the door panel.

16. The method of claim 15 including:

pre-assembling the door assembly as a unit including a body, the shield, and an integral gasket configured to engage the dispensing bin when the dispensing bin is mounted on the manifold assembly and to thereby form an airtight seal between the body and the dispensing bin; and thereafter mounting the pre-assembled door assembly on the manifold.

17. The method of claim 14 wherein:

the dispensing apparatus includes a vacuum source fluidly connected to the manifold; and when the door panel is in the open position, the vacuum source is operable to provide a suction flow at the inlet port and the dispensing bin port to induce an airflow through the dispensing bin.

18. The method of claim 17 wherein:

the dispensing bin defines a hopper chamber and contains a plurality of solid articles in the hopper chamber; and the induced airflow agitates the solid articles in the hopper chamber.

19. The method of claim 17 wherein:

the dispensing bin defines a dispensing channel and contains a plurality of solid articles; and the induced airflow drives the solid articles from the hopper chamber through the dispensing channel.

* * * * *